(12) United States Patent
Els et al.

(10) Patent No.: US 10,469,499 B2
(45) Date of Patent: Nov. 5, 2019

(54) WEBSITE FILTERING USING BIFURCATED DOMAIN NAME SYSTEM

(71) Applicant: Calix, Inc., Petaluma, CA (US)

(72) Inventors: Henning Els, Penngrove, CA (US); Miguel A. Alonso Ferre, Petaluma, CA (US)

(73) Assignee: Calix, Inc., Petaluma, CA (US)

( * ) Notice: Subject to any disclaimer, the term of this patent is extended or adjusted under 35 U.S.C. 154(b) by 211 days.

(21) Appl. No.: 15/198,781

(22) Filed: Jun. 30, 2016

(65) Prior Publication Data

US 2018/0007054 A1    Jan. 4, 2018

(51) Int. Cl.
*H04L 29/06*    (2006.01)
*H04L 29/12*    (2006.01)
*H04L 29/08*    (2006.01)

(52) U.S. Cl.
CPC ........ *H04L 63/101* (2013.01); *H04L 61/1511* (2013.01); *H04L 61/2514* (2013.01); *H04L 63/0245* (2013.01); *H04L 63/0254* (2013.01); *H04L 63/0281* (2013.01); *H04L 61/2007* (2013.01); *H04L 63/1483* (2013.01); *H04L 67/02* (2013.01); *H04L 67/2814* (2013.01)

(58) Field of Classification Search
None
See application file for complete search history.

(56) References Cited

U.S. PATENT DOCUMENTS

| | | | | |
|---|---|---|---|---|
| 9,705,922 B2 * | 7/2017 | Foxhoven | ............... | H04L 63/20 |
| 2004/0003113 A1 * | 1/2004 | Keohane | ........... | H04L 29/12009 |
| | | | | 709/245 |
| 2008/0209057 A1 | 8/2008 | Martini et al. | | |
| 2009/0157889 A1 * | 6/2009 | Treuhaft | ........... | H04L 29/12066 |
| | | | | 709/230 |
| 2012/0023153 A1 * | 1/2012 | Karasaridis | ......... | H04L 61/1511 |
| | | | | 709/203 |
| 2012/0203904 A1 * | 8/2012 | Niemela | ........... | H04L 29/12066 |
| | | | | 709/225 |
| 2012/0297478 A1 * | 11/2012 | Martin | .............. | H04L 29/12066 |
| | | | | 726/22 |
| 2013/0225151 A1 | 8/2013 | King et al. | | |

(Continued)

FOREIGN PATENT DOCUMENTS

WO    WO-2015121617 A1    8/2015

*Primary Examiner* — Benjamin E Lanier
(74) *Attorney, Agent, or Firm* — Schwegman Lundberg & Woessner, P.A.

(57) ABSTRACT

Systems and techniques for website filtering using bifurcated domain name system are described herein. A domain name system (DNS) request may be received. An internet address for a DNS service of an internet service provider (ISP) and an internet address for a DNS service provider external to the ISP may be determined. The ISP may provide external network services to the services gateway. The DNS service provider may maintain a website filtering list. The DNS request may be forwarded to the internet address for the DNS service of the ISP and the internet address of the DNS service provider external to the ISP. A first response and a second response to the DNS request may be received from the respective DNS services. A DNS request response may be transmitted to a client computing device connected to an internal network of the services gateway upon receipt of the first and second responses.

18 Claims, 6 Drawing Sheets

(56) References Cited

U.S. PATENT DOCUMENTS

2014/0379916 A1* 12/2014 Chan .................... H04L 41/046
709/225
2015/0288721 A1   10/2015 Lemon et al.
2015/0334116 A1* 11/2015 Martini ............... H04L 61/1511
726/1
2017/0374088 A1* 12/2017 Pappu ................. H04L 61/1511
2018/0302375 A1   10/2018 Els

* cited by examiner

WEBSITE FILTERING USING BIFURCATED DOMAIN NAME SYSTEM

TECHNICAL FIELD

The disclosure generally relates to computer networks and, more particularly, to website filtering using domain name system (DNS).

BACKGROUND

A computer network is a collection of interconnected computing devices that may exchange data. Computer devices on the computer network may communicate with each other using a system of addresses such as internet protocol (IP) addresses. Some computer devices on the computer network may host web-based services or resources that are available to users such as, for example, a website. A user may not know the individual IP address of a computing device or collection of computing devices hosting a website. However, the user may know the uniform resource locator (URL) for the resource the user would like to reach. The URL may be a more memorable reference such as, for example www.somewebsite.com. When the user enters the address into a browser of a computing device, the computing device may contact a domain name system (DNS) server to resolve the URL into an IP address hosting the resource. Some websites contain content that may be harmful to a receiving computer device such as, for example, a virus. Some websites may contain content that some users may find objectionable.

SUMMARY

In general, this disclosure describes techniques that may allow a services gateway (e.g., a modem, router, other internet service terminal, etc.) to bifurcate (e.g., split) a DNS request into two DNS requests to be forwarded to an ISP DNS server and an external DNS server (e.g., a website filtering DNS server). The services gateway may then receive two responses to the DNS request including an IP address for a hostname included in the DNS request from the ISP DNS server and an indication of whether a client device should be allowed to continue to the hostname. Bifurcating the DNS request may increase performance by allowing the requests to be processed in parallel and may increase reliability as DNS resolution may not be impacted if the external DNS fails to respond to the request.

In one example, this disclosure is directed to a services gateway for website filtering using bifurcated domain name system (DNS). The services gateway comprises one or more processors and at least one memory including instructions that, when executed by the one or more processors, cause the one or more processors to perform operations to receive a DNS request, the DNS request including a hostname corresponding to a website; determine a first internet address for a DNS service of an internet service provider (ISP), the ISP providing external network services to the services gateway; determine a second internet address for a DNS service provider external to the ISP, the DNS service provider maintaining a website filtering list; forward the DNS request to both the first internet address for the DNS service of the ISP and the second internet address of the DNS service provider external to the ISP; receive a first response to the DNS request from the DNS service of the ISP; receive a second response to the DNS request from the DNS service provider external to the ISP; and transmit, upon receipt of both the first response and the second response, a DNS request response to a client computing device, the client computing device connected to an internal network provided by the services gateway.

In another example, this disclosure is directed to at least one machine readable medium including instructions for website filtering using bifurcated domain name system (DNS) that, when executed by a machine, cause the machine to perform operations to receive a DNS request, the DNS request including a hostname corresponding to a website; determine a first internet address for a DNS service of an internet service provider (ISP), the ISP providing external network services to the services gateway; determine a second internet address for a DNS service provider external to the ISP, the DNS service provider maintaining a website filtering list; forward the DNS request to both the first internet address for the DNS service of the ISP and the second internet address of the DNS service provider external to the ISP; receive a first response to the DNS request from the DNS service of the ISP; receive a second response to the DNS request from the DNS service provider external to the ISP; and transmit, upon receipt of both the first response and the second response, a DNS request response to a client computing device, the client computing device connected to an internal network provided by the services gateway.

In another example, this disclosure is directed to a method for website filtering using bifurcated domain name system (DNS). The method comprises receiving, by a services gateway, a DNS request, the DNS request including a hostname corresponding to a website. Determining a first internet address for a DNS service of an internet service provider (ISP), the ISP providing external network services to the services gateway. Determining a second internet address for a DNS service provider external to the ISP, the DNS service provider maintaining a website filtering list. Forwarding the DNS request to both the first internet address for the DNS service of the ISP and the second internet address of the DNS service provider external to the ISP. Receiving a first response to the DNS request from the DNS service of the ISP. Receiving a second response to the DNS request from the DNS service provider external to the ISP. Transmitting, upon receiving both the first response and the second response, a DNS request response to a client computing device, the client computing device connected to an internal network provided by the services gateway.

In another example, this disclosure is directed to a domain name system (DNS) service for website filtering using bifurcated DNS. The DNS service comprising one or more processors and at least one memory including instructions that, when executed by the one or more processors, cause the one or more processors to perform operations to receive a DNS request forwarded by a services gateway; extract from the DNS request a hostname corresponding to a website; resolve the hostname to an internet address; compare the internet address to a website filtering list; and transmit a response to the DNS request to the services gateway based on the comparison.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Website filtering may be used for a variety of reasons such as parental control (e.g., to prevent children from viewing objectionable content, etc.) and threat avoidance (e.g., to prevent computer virus infections, email phishing attempts, etc.) Existing techniques may utilize a software client installed on a computing device (e.g., a computer, tablet, phone, etc.) to identify and block websites visited using a web browser. For example, the software client may allow a user to input a list of website uniform resource locators (URL) to which the browser should be prevented from navigating. Some existing techniques may use domain name system (DNS) blocking. However, the existing techniques may rely on reconfiguring the DNS settings on a computing device or a change in the DNS configuration of an internet service provider (ISP).

DNS is a system for resolving a hostname (e.g., such as those included in URLs) into an internet protocol (IP) address (e.g., a network identifier assigned to a computing device that allows communication between the computing device and other computing devices). DNS servers may be authoritative (e.g., hold the master record for an IP address and hostname pair) or recursive (e.g., hold a list of DNS records provided by the authoritative DNS servers). DNS allows users to use memorable hostname URLs such as www.somewebsite.com to access web-based resources rather than having to remember a numerical IP address such as 127.0.0.1 for each website host they would like to visit. DNS.

The present subject matter includes systems and techniques for providing website filtering using bifurcated DNS. A services gateway (e.g., a residential services gateway, etc.) providing an internal network to client computing devices and providing external network (e.g., the internet, etc.) access to the client computing devices. The services gateway may receive DNS requests from client computing devices connected to the internal network. A user (e.g., ISP subscriber, etc.) of the services gateway may be prevented (e.g., due to access control policies of the ISP, lack of knowledge of how to reconfigure the services gateway, etc.) from reconfiguring DNS server settings of the services gateway. It may be time consuming and costly for the ISP to reconfigure DNS settings on individual services gateways and its DNS servers.

The techniques disclosed provide an efficient and quickly deployable solution for web filtering by avoiding reconfiguration of the services gateways and ISP DNS servers as well as avoiding the installation of client software on client computing devices. An additional benefit of the disclosed techniques may be that if the external DNS service is unavailable, but the ISP DNS is available, the subscriber may not lose internet connectivity, but only parental control services. A services gateway may bifurcate the request to the 2 DNS services, thus, if it receives a response from the ISP DNS and not the external DNS, it may simply return the response it received from the ISP DNS. Therefore, the user may be able to communicate with all sites as resolved by the ISP DNS. In existing techniques, the external DNS may sit 'inline', and the ISP DNS may sit upstream from the external DNS. In such a configuration, if the external DNS becomes unavailable, then both the internet and parental control service may be lost. The techniques disclosed may also reduce latency as the services gateway may bifurcate the DNS request by forwarding it to an ISP DNS server and to an external DNS service providing website filtering. The DNS request may then be processed by the external DNS service and the ISP DNS server in parallel rather than forwarding a filtering request to a website filtering service (e.g., a web-based service maintain a blocking list, etc.) and subsequently to the ISP DNS server.

The services gateway may be a modem, router, or other network device acting as a termination point for a network provided by an ISP such as, for example, a broadband cable network, a fiber optic network, a digital subscriber line (DSL) network, etc. The services gateway may provide an internal network to client computing devices connected to the services gateway. The services gateway may be connected to an ISP network providing access to external resources (e.g., the internet). The services gateway may be configured as a DNS server for an internal client computing device. When an internal client computing device requests an external resource (e.g., a webpage, etc.) the client computing device may send a DNS request to the services gateway requesting that a hostname provided for the resource be resolved to an IP address.

The services gateway may be configured with an IP address for one or more ISP DNS servers as well as one or more IP addresses for one or more external DNS servers of an external DNS service provider. The services gateway may forward the request to a DNS server of the ISP and the DNS server of the ISP may return a response including an IP address corresponding to the hostname. The service gateway may forward the DNS request to a DNS server of the external DNS service provider. The DNS server of the external DNS service provider may resolve the hostname to an IP address and may compare the hostname and the IP address to a filtering list (e.g., a list of blocked and allowed hostnames or IP addresses, etc.) The DNS server of the external DNS service provider may then return a response to the services gateway with an indication that the requested resource (e.g., identified by the hostname, IP address, etc.) is allowed (or blocked).

Having received the response from the DNS server of the ISP and the DNS server of the external DNS service provider, the services gateway may determine a response to transmit to the internal client computing device. For example, if the response received from the DNS server of the external DNS service provider indicated the resource is allowed, the services gateway may transmit the response provided by the DNS server of the ISP including an IP address corresponding to the hostname to the internal client computing device that sent the DNS request to the services gateway. Or, if the response from the DNS server of the external DNS service provider indicated the resource is blocked, the services gateway may discard the response provided by the DNS server of the ISP and may transmit a message to the internal client computing device that sent the DNS request indicating that the resource was blocked. In this manner, bifurcated DNS may intercept the ISP DNS server response preventing harmful or objectionable content from being delivered to the internal client computing device.

The DNS server of the external DNS service provider may use one or more filtering lists to determine whether a resource is allowed or blocked. In some examples, a filtering list may be provided by a user of the services gateway. For example, the services gateway may present the user with a graphical user interface for entering individual resources to block or allowed list. In an example, the user may be able to select categories of blocked or allowed content (e.g., adult websites, gambling websites, child friendly websites, etc.) The services gateway may then transmit the inputs received using the graphical user interface to the external DNS service provider. The DNS service provider may then add the specific sites and sites associated with the categories to a filtering list particular to users of the services gateway. The DNS server of the external DNS service provider may select the filtering list based on an identifier (e.g., external IP address, etc.) of the services gateway.

In some examples, several users may use a variety of computing devices connected to the internal network provided by the services gateway. Individual filtering lists may be generated for each computing device based on an identifier for each computing device (e.g., by internal IP address, media access control (MAC) address, etc. assigned to each computing device) connected to the internal network provided by the services gateway. In an example, the identifier of an internal computing device may be sent to the DNS server of the external DNS service provider along with the forwarded DNS request. The DNS server of the external DNS service provider may then use the identifier to select a filtering list. For example, a user called 'Dad' may have a policy set to 'No parental controls'. Another user called 'Michael', a child of 10, may have a policy set to certain time windows. Each user may be associated with 0 or more devices. For example, Dad may have devices with MAC of 00:00:00:00:01 and 00:00:00:00:02 (e.g., device ID). When a request is received by the external DNS service, it may extract the device ID (e.g., MAC address, internal IP address, etc.) from the request, then may look up the user it belongs to, and may then look up the policy associated with the user. At this point, it may select an appropriate policy to apply to the request.

In some examples, the external DNS service provider may maintain a filter list including hosts of known harmful sites. For example, the filter list of known harmful sites may include sites identified to contain computer viruses, host phishing websites, etc. The filter list of known harmful sites may be referenced in addition to a specific filter list for the services gateway or each internal client computing device or may be added to each specific filter list.

Various techniques of this disclosure may solve the problem of having to reconfigure the DNS addresses of client computing devices and the ISP DNS servers by bifurcating the request into two requests, one to the ISP for resolving the hostname to and IP address and a second to an external DNS service provider for determining whether a resource should be blocked or allowed. The present subject matter may result in faster content filtering as hostname resolution operations and filtering operations may be performed in parallel.

Figure 1:
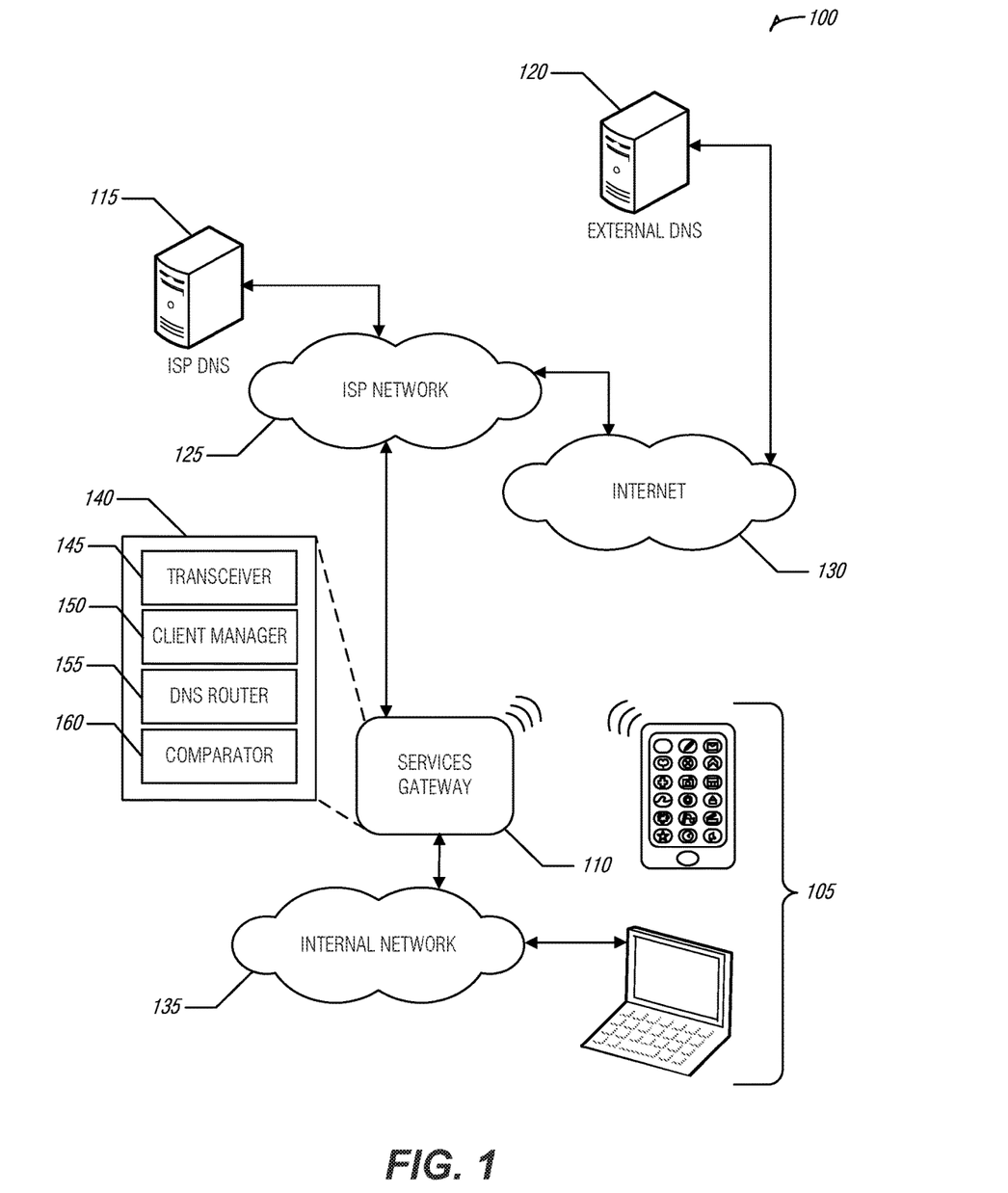
FIG. 1 illustrates an environment including a system for website filtering using bifurcated domain name system, according to various embodiments.

FIG. 1 illustrates an environment 100 including a system 140 for website filtering using a bifurcated domain name system, according to various embodiments. The environment 100 may include one or more client devices 105 communicatively coupled to a services gateway 110 through an internal network (e.g., internal network 135, wireless network, etc.). The services gateway 115 may be communicatively coupled to an internet service provider (ISP) domain name system (DNS) server 115 using an ISP network 125 and to an DNS server of an external DNS service provider 120 using an external network (e.g., the internet 130, etc.).

A user of a client computing device 105 (also referred to in this disclosure as a "client device 105" or a "computing device 105") may request an internet resource (e.g., a webpage, etc.) hosted on an external host (e.g., a server, a collection of servers, etc. providing the resource). For example, the user may open a web browser, enter a uniform resource locator (URL) www.somewebsite.com, and click on a button to request a webpage associated with www.somewebsite.com. The host of the resource may be found by resolving a hostname included in the URL to an internet protocol (IP) address (e.g., somewebsite.com may be resolved to 127.0.0.1, etc.).

The client may be configured with one or more addresses of DNS servers to which a DNS request may be sent to resolve the hostname to an IP address. The client computing device may be configured with the internet protocol (IP) address of the services gateway 110, which may act as a DNS server. In some examples, the client computing device may be configured to automatically (e.g., without user interaction, etc.) obtain network configuration information from the services gateway 110 (e.g., using dynamic host configuration protocol (DHCP)). The client computing device may be assigned an IP address and may be configured with the IP address of the services gateway 110 acting as a DNS server.

The ISP network 125 may be a network provided by the ISP including a collection of servers providing network services to subscribed devices such as the services gateway 110. The ISP network may include the ISP DNS server 115. The ISP DNS server may provide hostname resolution services for the services gateway 110. For example, the ISP DNS server 115 may resolve hostname somewebsite.com to IP address 127.0.0.1. The ISP network 125 may be considered an external network to the one or more client computing devices 105.

The ISP network 125 may be communicatively coupled (e.g., using a router, etc.) to the internet 130. The internet 130 may be considered external to the ISP network 125 and may include a collection of internet based resources such as the external DNS server 120. The external DNS server 120 may be maintained by an external DNS service provider and may evaluate DNS requests against one or more filter lists to determine if a host provided in the DNS request should be allowed or blocked. For example, the external DNS server 120 may determine that the DNS request for hostname somewebsite.com should be blocked based on an evaluation of a filter list including websites containing malicious content (e.g., computer viruses, phishing webpages, etc.). The external DNS service is described in additional detail in FIG. 2.

The services gateway 110 may include a system 140 for providing website filtering using bifurcated DNS. The system 140 may include a transceiver 145, a client manager 150, a DNS router 155, and a comparator 160. The system 140 may manage filtering lists and DNS requests for the one or more client computing devices 105.

The transceiver 145 may receive and process incoming and outgoing data. The transceiver 145 may receive a DNS request from a client computing device 105, for example. The DNS request may include a hostname corresponding to a website. The DNS request may be received from a computing device connected (e.g., a computing device 105) to an internal network (e.g., internal network 135, wireless network, etc.) provided by the services gateway 110. For example, the transceiver may receive the DNS request associated with the request for the resource www.somewebsite.com.

Each client device of the one or more client devices 105 may be assigned an internal IP address. The internal IP addresses may not be accessible by external entities (e.g., computers outside the internal network, etc.). The client manager 150 may maintain a record of client computing devices connected to the internal network provided by the services gateway 110. When a DNS request is received from a client device 105, the services gateway 110 may translate the internal address of a client computing device to an external IP address assigned to the services gateway 110 by an ISP (e.g., using network address translation (NAT), etc.). For example, the services gateway 110 may forward the DNS request associated with the request for www.somewebsite.com to the ISP DNS server 115 and the external DNS server 120 by adding the IP address of the client device 105 in the DNS request and retaining the external IP address of the services gateway 110.

The client manager 150 may record requests made by each client device so that responses to the forwarded DNS request may be sent back to the correct client computing device. The external IP address may be maintained because it may be used as the destination IP address of the response and the external DNS server may use this information to determine from which network subscriber (e.g., residence, business, etc.) the DNS request came from. Once the external DNS server knows the subscriber it may use this information to determine the users for this household like Dad or Michael. It may then determine to which user this device belongs to (e.g., each device may be associated with a user). At this point it may select an appropriate user policy (e.g., filtering list) to apply and how to respond to the DNS request.

The service gateway 110 may split or bifurcate DNS requests received from the client device 105 so they may be processed in parallel by a DNS server of the ISP and an external DNS server. To this end, the DNS router 155 of the services gateway 110 may bifurcate DNS requests by forwarding them to both the ISP DNS server 115 and the external DNS server 120. The DNS router 155 may determine an internet address for a DNS service of an ISP (e.g., the ISP DNS server 115, etc.). For example, the DNS router 155 may reference a table of DNS server addresses to identify the IP address for the DNS server of the ISP. The ISP may provide external network services to the services gateway 110. The DNS router 155 may determine an internet address for a DNS service provider external to the ISP (e.g., the external DNS server 120, etc.). For example, the DNS router 155 may reference a table of external DNS server provider addresses to determine the internet address of the external DNS server. The external DNS service provider may maintain a website filtering list. The DNS router 155 may forward the DNS request to the internet address for the DNS service of the ISP (e.g., the ISP DNS server 115, etc.) and the internet address of the DNS service provider external to the ISP (e.g., the external DNS server 120, etc.). For example, the DNS router 155 may forward the DNS request associated with www.somewebsite.com to the ISP DNS server 115 and the external DNS server 120.

The DNS router 155 may receive a response to the DNS request from the DNS service of the ISP (e.g., from the ISP DNS server 115, etc.). The DNS router 155 may store (e.g., in memory, etc.) the response while waiting for a response from the DNS service provider external to the ISP. For example, the DNS router 155 may receive a response to the DNS request associated with the request for www.somewebsite.com and the DNS router 155 including the IP address of the host somewebsite.com and the DNS router may store the response in memory until a response is received from the external DNS server 120. Alternatively or additionally, the DNS router 155 may store a response to the DNS request received from the DNS service provider external to the ISP if it is received before the response from the DNS service of the ISP.

The services gateway 110 may evaluate the responses received from the ISP DNS server 115 and the external DNS server 120 to determine a response, if any, to transmit to the client device 105. To this end, the comparator 160 of the service gateway 110 may evaluate the responses to determine a DNS request response to be transmitted to the client device 105. For example, the comparator 160 may determine if the requests include the same or similar answer to the DNS request. The ISP DNS service may return an answer section with an indication of an IP address corresponding to the hostname included in the DNS request. The comparator 160 may compare the answer section of the response received from the ISP DNS service to an answer section included in the response received from the DNS service external to the ISP.

A DNS response anatomy has a section called 'ANSWER', which could be empty or filled with 1 or more IP addresses. The comparator 160 may return the result received from the ISP DNS if the response from the external DNS has some value in the ANSWER section. If the response from the external DNS is empty, then the gateway may respond to the client device with a DNS response with an empty ANSWER section. In other words, the comparator 160 may evaluate whether the response from the external DNS is empty or not. If empty, the comparator 160 may respond by transmitting an empty ANSWER section to the client device. If populated (e.g., non-empty), then the comparator 160 may respond by transmitting the answer received from the ISP DNS. In other words, the content of the ANSWER section received from the external DNS is significant in whether it is populated or empty. For example, the comparator 160 may indicate a Boolean condition whether the response from the ISP will be returned or not. This may ensure that the external DNS does not get in the way or intrude with the values returned from the ISP DNS.

The DNS service external to the ISP may check the hostname and an IP address corresponding with the hostname to a set of website filtering lists. Thus, the response to the DNS request received from the DNS service external to the ISP may include an indication of whether a host included in the DNS request was allowed or blocked based on an evaluation by a DNS server of the DNS provider external to the ISP of the host to one or more filtering lists. For example, the DNS request response from the external DNS service provider may include an answer section indicating that hostname somewebsite.com corresponds with IP address 127.0.0.1 and the response received from the DNS service of the ISP may include an answer section indicating that hostname somewebsite.com corresponds with IP address 127.0.0.1. In response, the comparator 160 may generate a response forwarding the response received from the ISP DNS service for transmission to the client device 105.

In some cases, the DNS request response from the external DNS service provider may indicate that the host is blocked (e.g., contains a blank answer section, answer section includes an indication the message was blocked, etc.). The comparator 160 may determine that the answer section of the response received from the DNS service external to the ISP does not match the answer section of the response received from the ISP DNS service. For example, a blank answer section may be determined not to match an answer section including the indication that hostname somewebsite.com corresponds to IP address 127.0.01.

In some examples, the comparator 160 may discard (e.g., not transmit, etc.) the response received from the DNS service of the ISP if the response received from the DNS service external to the ISP contains a blank answer section. If the DNS service external to the ISP returns a blank answer section, a response including a blank answer section may be transmitted to the client device preventing the client device from proceeding to the requested website. In some examples, a message indicating the DNS request was blocked may be generated by the comparator 160 for transmission to the client device 105 if it is determined that the response from the DNS service external to the ISP does not match the response received from the ISP DNS service. In an example, the DNS request response may include a message that the website has been blocked by the DNS service provider external to the ISP (e.g., the external DNS server 120, etc.).

Upon determining a response to be transmitted to the client device 105, the comparator 160 may transmit the response to the transceiver 145 for processing. The transceiver 145 may then transmit the DNS request response to the client device 105. The client device 105 may be connected to an internal network provided by the services gateway 110. In some examples, the transceiver 145 may forward the response to the DNS request received from the DNS service of the ISP.

In some examples, the services gateway 110 may determine an identifier of a sender (e.g., a client computing device of the one or more client computing devices 105) of the DNS request. The identifier may be an internal internet protocol (IP) address of the sender of the DNS request. The IP address may have been issued by the services gateway 110. The identifier of the sender may be forwarded to the external DNS server 120 along with the DNS request. The response received from the external DNS server 120 may also include the identifier of the sender, e.g., IP address, MAC address, etc. The client computing device to which the DNS response is transmitted may correspond to the identifier of the sender.

The internal network may use non-publicly addressable IP addresses that can protect the client computing devices 105 from external threats. When the client device 105 requests an external resource (e.g., a webpage, etc.), the internal IP address of the client may be translated (e.g., using network address translation (NAT), etc.) into an externally accessible address assigned to the services gateway.

The present subject matter may be implemented in various configurations. For example, the transceiver 145, the client manager 150, the DNS router 155, and the comparator 160 may be implemented in different (or the same) computing systems (e.g., a single server, a collection of servers, a cloud-based computing platform, etc.). A computing system may comprise one or more processors (e.g., hardware processor 602 described in FIG. 6, etc.) that execute software instructions, such as those used to define a software or computer program, stored in a computer-readable storage medium such as a memory device (e.g., a main memory 604 and a static memory 606 as described in FIG. 6, a Flash memory, random access memory (RAM), or any other type of volatile or non-volatile memory that stores instructions), or a storage device (e.g., a disk drive, or an optical drive).

Alternatively, the computing system may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

Figure 2:
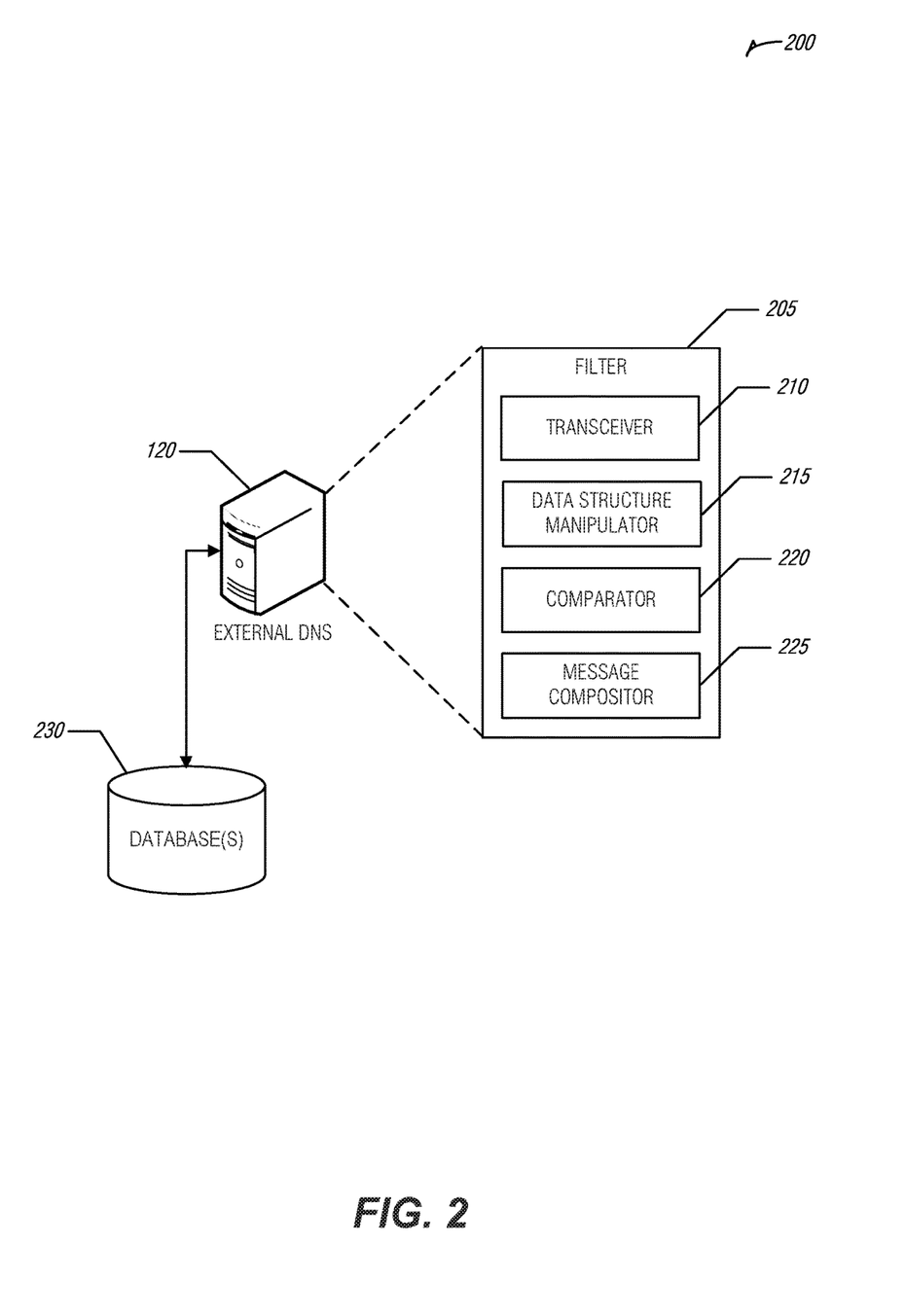
FIG. 2 illustrates an example of a domain name system service for website filtering using bifurcated domain name system, according to various embodiments.

FIG. 2 illustrates an example of a domain name system service 200 for website filtering using bifurcated domain name system, according to various embodiments. The domain name system (DNS) service 200 may include a collection of DNS servers such as external DNS server 120 as described in FIG. 1. The external DNS server may be communicatively coupled to one or more databases 230. The one or more databases 230 may include databases including lists (e.g., collections, etc.) of DNS records (e.g., hostname to internet protocol (IP) address pairs, etc.) and filtering lists (e.g., collections of allowed and blocked hostnames and IP addresses, etc.).

The external DNS server 120 may include a filter 205 for filtering DNS requests (e.g., identifying allowed requests and blocked requests, etc.). The filter 205 may include a variety of components such as transceiver 210, data structure manipulator 215, and message compositor 225.

The transceiver 210 may receive and process incoming and outgoing data. For example, the transceiver 210 may receive a DNS request and a filter list from a services gateway (e.g., the services gateway 110 as described in FIG. 1, etc.). The transceiver may receive a DNS request forwarded by a services gateway. For example, a user of a client computing device (e.g., a client computing device of the one or more client computing devices 105 as described in FIG. 1) connected to an internal network (e.g., the internal network 135 as described in FIG. 1) provided by the services gateway may request a webpage using a uniform resource locator (URL) of www.somewebsite.com and the services gateway may forward a DNS request sent by the client computing device to resolve somewebsite.com to an internet protocol (IP) address.

The comparator 220 may extract a hostname corresponding with a website from the DNS request. The comparator may then resolve the hostname to an internet address. In an example, the comparator 220 may compare the hostname to a set of DNS records stored in the one or more databases 230. For example, the comparator 220 may compare the hostname somewebsite.com to the DNS records and the comparison may indicate that an address of 127.0.0.1 corresponds with the hostname somewebsite.com.

The comparator 220 may compare the internet address to a website filtering list. Alternatively or additionally, the comparator 220 may compare the hostname to the website filtering list. In an example, the website filtering list may include one or more internet addresses. In an example, the website filtering list may include one or more hostnames. In some examples, the transceiver 205 may receive an identifier for a computing device that sent the DNS request to the services gateway. The comparator 220 may select the website filtering list using the identifier. DNS servers are configured as authoritative over some domain names and for other domain names they may make use of a recursive mechanism to be routed to an authoritative DNS server for the domain name. A local database of DNS entries may exist for a list of domain names over which a DNS server is authoritative. DNS servers may cache of previous responses to avoid recursive calls which already occurred which may speed up the response. However, the external DNS server may not contain traditional DNS records as it may not provide traditional DNS resolution but rather may reference a set of website filtering lists providing an indication whether a website is allowed or blocked, for example, by returning a populated or an empty ANSWER section in response to a DNS request. However, the external DNS server may cache responses to requests to increase response times.

In some examples, the comparator 220 may run a comparison against a plurality of website filtering lists. A website filtering list may include records of blocked and allowed websites. In some examples, the website filtering list may be specific to a services gateway. In some examples, the website filtering list may be specific to a client device connected to the internal network provided by the services gateway.

The data structure manipulator 215 may create and modify the website filtering list. The website filtering list may be created as a data structure (e.g., formatted information stored in memory, storage, etc.). The data structure manipulator 215 may manipulate a data structure associated with the website filtering list automatically (e.g., without user interaction) and manually (e.g., with user interaction. For example, the DNS service may use a variety of rules (e.g., if/then assessments, database query instructions, etc.) for determining websites that should be filtered. The data structure manipulator 415 may manipulate the data structure associated with the website filtering rule based on the rule. For example, a new computer threat type (e.g., computer virus, phishing, etc.) may be identified and the data structure manipulator 215 may expand the data structure corresponding to the website filter list to include the new threat type.

In some examples, the transceiver 210 may receive a website category from a user. In an example, the user may be a services gateway subscribed to the DNS service. In some examples, website categorization may be obtained from predefined lists (e.g., publicly available, open-sourced, closed commercial lists, etc.). In an example, a user interface may be provided to a user of the services gateway and the website category may be received using input obtained from the graphical user interface. For example, the user may then be presented with a graphical user interface allowing selection of one or more available website categories. The data structure manipulator 215 may generate a new data structure based on the category or may manipulate an existing data structure to include the category. The data structure manipulator 215 may then determine one or more websites corresponding with the category and may include the one or more websites in the data structure corresponding to the website filtering list.

The data structure manipulator 215 may determine a set of internet addresses using the website category and may create the website filtering list using the set of internet addresses. Alternatively or additionally, the data structure manipulator 215 may determine a set of hostnames using the website category and may create the website filtering list using the set of hostnames. For example, the user may have provided a category of adult sites and the data structure manipulator 215 may obtain the set of internet addresses and the set of hostnames from a repository of websites organized by category. In an example, the DNS service may store and maintain a categorized list of websites in a database included in the one or more databases 230.

In some examples, a user may provide one or more individual websites along with an indication of whether each of the one or more websites should be allowed or blocked. The data structure manipulator 215 may include the one or more websites and the indication in the web filtering list. For example, the user may manage parental controls by:
  creating a user object for each user in his house, like one for 'Dad', and one for 'Michael'
  Manage policy by user. The user may specify allowed or blocked categories and may specify specific websites that may be either always allowed or blocked regardless of corresponding category.
  The user may associate devices to each user (e.g., each user of the internal network, etc.) so that the policy may be applied to each user associated device.

For example, www.cnn.com may be identified as a 'News' site, or www.google.com may be identified as a 'Search' site. This information may be used in combination with a user profile for the computing device sending the DNS request. For example, the user profile may say that Michael is allowed to visit 'Search' sites, but not 'News' sites. In some examples, the user profile may include calendaring features that may allow a user to visit websites as some times and dates and not at other times or dates. For example, Michael may be allowed to visit news sites between 7:00 pm and 8:00 pm Monday through Friday and 12:00 pm to 8:00 pm on Saturday and Sunday.

The message compositor 225 may generate a response to the received DNS request based on the comparison by the comparator 220. The message compositor may generate a response including an indication of whether the DNS request should be allowed or blocked based on the comparison. For example, if the comparison indicates that the somewebsite.com contains malicious content (e.g., a phishing webpage, etc.) then the message may include an indication (e.g., a blank answer section, etc.) that the DNS request was blocked and an indication that the DNS request was blocked as containing malicious content.

The transceiver 205 may transmit a response to the DNS request to the services gateway based on the comparison. In an example, the transceiver 205 may transmit the response generated by the message compositor 225.

Figure 3:
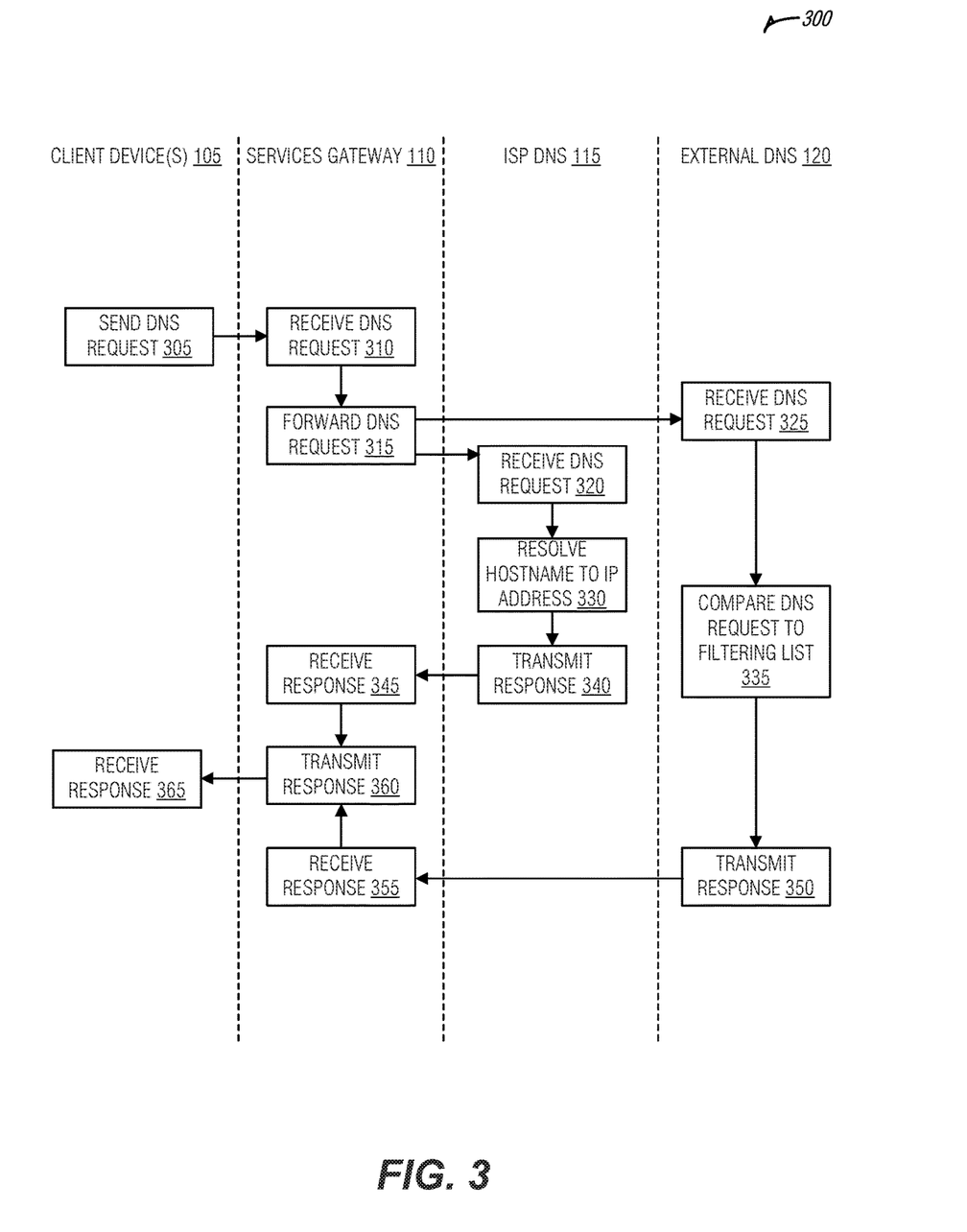
FIG. 3 illustrates an example of a workflow for website filtering using bifurcated domain name system, according to various embodiments.

FIG. 3 illustrates an example of a workflow 300 for website filtering using bifurcated domain name system, according to various embodiments. The workflow 300 may provide similar functionality as discussed in FIGS. 1 & 2.

At operation 305, a client device 105 may send a domain name system (DNS) request to the services gateway 110. For example, a user of the client device 105 may open a browser window and request a website with a uniform resource locator (URL) of www.somewebsite.com that may cause the client device 105 to transmit a DNS request to the services gateway 110 to resolve the hostname somewebsite.com to an internet protocol (IP) address.

At operation 310, the services gateway 110 may receive the DNS request. For example, the services gateway may receive the DNS request including the hostname somewebsite.com. The services gateway 110 may then forward the request at operation 315. The services gateway 110 may be configured with an IP address for one or more DNS servers, such as internet service provider (ISP) DNS server 115, responsible for hostname to IP address resolution for the ISP. The services gateway may be configured with an IP address for one or more DNS servers, such as external DNS server 120, responsible for resolving hostnames and filtering websites for an external DNS service provider. The services gateway 110 may be configured to forward (e.g., based on routing rules, etc.) DNS requests to the DNS request to the ISP DNS server 115 and the external DNS server 120.

In some examples, the services gateway 110 may include a list of client devices, such as client device 105, which are connected to an internal network provided by the service gateway 110 along with an internal IP address assigned to each client device. For example, a first client device may have an internal IP address of 192.168.1.2, a second client device may have an internal IP address of 192.168.1.3, and a third client device may have an internal IP address of 192.168.1.4. The services gateway 110 may transmit the internal IP address of the client device 105 along with the DNS request.

At operation 320, the ISP DNS server may receive the DNS request. For example, the ISP DNS server 115 may receive the DNS request including the hostname somewebsite.com. The ISP DNS server 115 may reference stored DNS records including hostname and IP address pairs. In some examples, the ISP DNS server 115 may reference another DNS server to locate DNS records for hostnames that may not be found in the stored DNS records. At operation 330, the ISP DNS server 115 may resolve the hostname to an IP address. For example, the ISP DNS server 115 may resolve the hostname somewebsite.com to IP address 127.0.0.1. The ISP DNS server 115 may then transmit a response to the services gateway 110 at operation 340. For example, the ISP DNS server 115 may transmit a response including an answer section indicating that hostname somewebsite.com resolves to IP address 127.0.0.1.

At operation 325, the external DNS server 120 may receive the DNS request transmitted by the services gateway 110. For example, the external DNS server 120 may receive the DNS request to resolve hostname somewebsite.com to an IP address. The external DNS server may reference a set of website filter lists including identifiers (e.g., hostnames, IP addresses, etc.) of websites which should be allowed or blocked. The set of website filter lists may include a website filter list corresponding to an external IP address assigned to the services gateway 110 by the ISP and a website filter list corresponding to the internal IP address of a client device sending the DNS request. For example, the external IP may be used to narrow down the request to a subscriber (e.g., a residence, business, etc.) and the internal IP address may be used to lookup an associated user (e.g., a user of the internal network, etc.) which may have a policy (e.g., website filtering list, etc.) assigned. This policy may be consulted to determine a response.

At operation 335, the external DNS server 120 may compare the DNS request to one or more website filtering lists. For example, the external DNS server 120 may identify a category of websites to be blocked and may consult a user policy (e.g., based on an identification of a sender of the request, etc.) to determine whether this particular DNS request's website is allowed or blocked. The one or more website filtering lists may be selected using the external IP address of the services gateway 110 and the internal IP address of the client device 105. For example, the external DNS server 120 may select the website filtering list corresponding to the external IP address of the services gateway 110 and may select the a website filtering list corresponding with the internal IP address of the client device 105.

The external DNS server 120 may determine if the hostname and an IP address corresponding to the hostname are included in the one or more website filtering lists. For example, the external DNS server may compare the hostname somewebsite.com with the website filtering list corresponding with the internal IP address of the client device 105 and determine that the hostname is blocked. The external DNS server 120 may then compose a response to the DNS request. For example, if the hostname is not determined to be blocked (e.g., not found in the one or more website filtering lists, found on a list indicating the hostname should be allowed, etc.) a response with the answer section populated be composed. For example, if the hostname in determined to be blocked a response without information in the answer section may be composed. The external DNS server 120 may then transmit the composed response to the service gateway 110.

At operation 345, the services gateway 110 may receive the response to the DNS request transmitted by the ISP DNS server 115. For example, the services gateway 110 may receive a response from the ISP DNS server 115 with an answer section indicating that hostname somewebsite.com resolves to IP address 127.0.0.1.

At operation 355, the services gateway 110 may receive the response to the DNS request transmitted by the external DNS server 120. For example, the services gateway 110 may receive a response from the external DNS server 120 with an answer section indicating that hostname somewebsite.com resolves to IP address 127.0.0.1 if the hostname somewebsite.com or the IP address 127.0.0.1 were determined by the external DNS server 120 to be allowed. For example, the services gateway 110 may receive a response from the external DNS server 120 with a blank answer section if the hostname somewebsite.com or the IP address 127.0.0.1 were determined by the external DNS server 120 to be blocked.

At operation 360, the service gateway 110 may compare the response received from the ISP DNS server 115 and the external DNS server 120 to generate a response to be transmitted to the client device 105. For example, the services gateway 110 may discard the response received from the ISP DNS server 110 and transmit a response including a blank answer section if the response received from the external DNS server 120 contains a blank answer section. In an example, the services gateway 110 may forward the response received from the ISP DNS server if the answer section of the response received from the external DNS server 120 matches (e.g., is non-empty, etc.) the answer section of the response received from the ISP DNS server 115. In some examples, the services gateway 110 may generate a response for transmission to the client device 105 including a message indicating that the request was blocked and a reason (e.g., known phishing website, known gambling site, etc.) why the request was blocked. In an example, the external DNS server 120 may include the reason the request was blocked with the response transmitted at operation 350.

At operation 365, the client device 105 may receive a response to the DNS request. For example, the response may include an answer section indicating that the hostname somewebsite.com resolves to IP address 127.0.0.1 and the web browser may retrieve a webpage corresponding with www hosted by a computing device having IP address 127.0.0.1.

Figure 4:
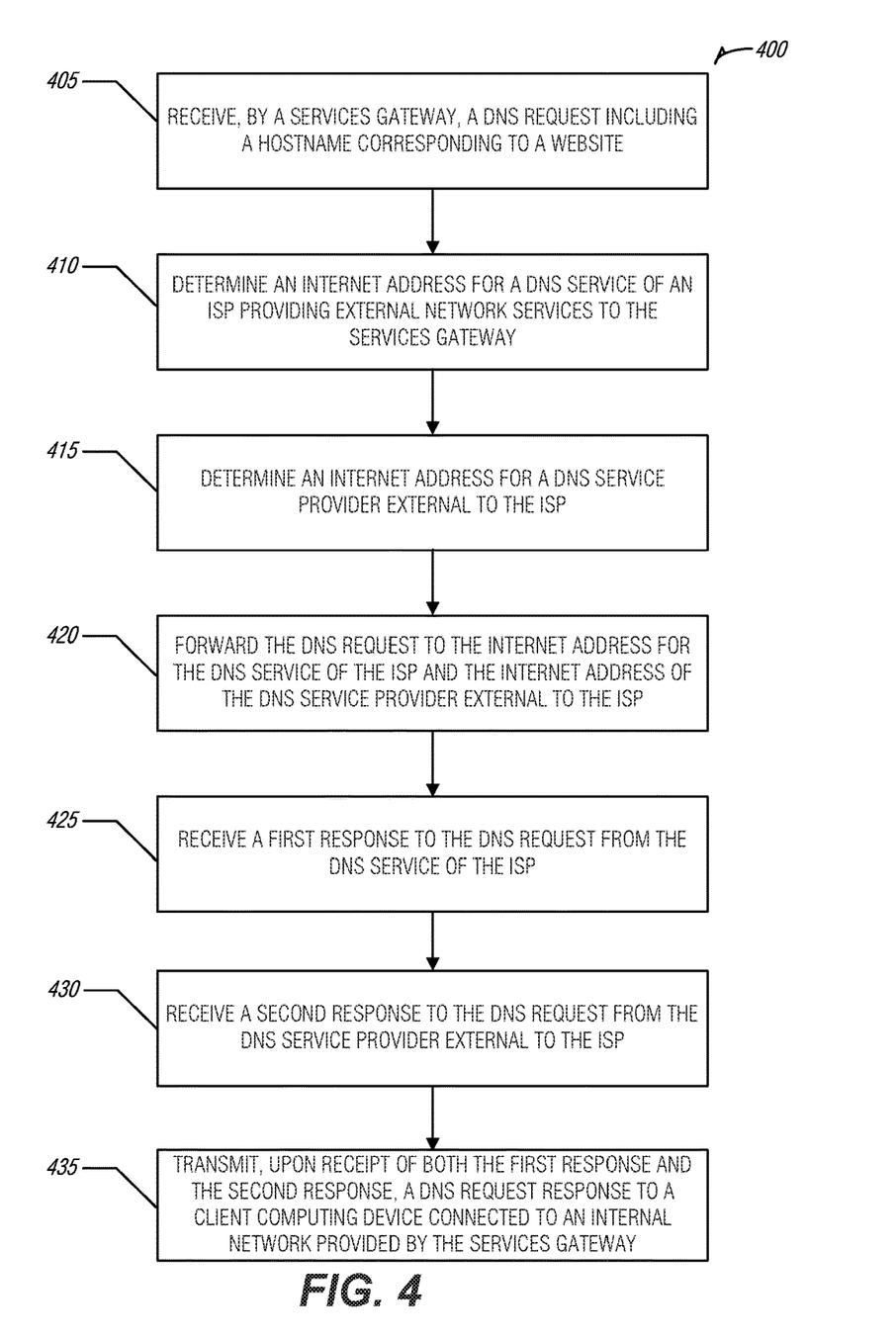
FIG. 4 illustrates a flowchart of an example of a method for website filtering using bifurcated domain name system, according to various embodiments.

FIG. 4 illustrates a flowchart of an example of a method 400 for website filtering using bifurcated domain name system, according to various embodiments. The method 400 may provide similar functionality as described in FIG. 1.

At operation 405, a domain name system (DNS) request may be received by a services gateway (e.g., the services gateway 110 as described in FIG. 1). The DNS request may include a hostname corresponding to a website. For example, a user may request a website using a uniform resource locator (URL) www.somewebsite.com. In an example, the DNS request may be received from a computing device (e.g., a computing device of the one or more computing devices 105 as described in FIG. 1) connected to an internal network (e.g., the internal network 135 as described in FIG. 1) provided by the services gateway.

At operation 410, an internet address may be determined for a DNS service of an internet service provider (ISP) (e.g., the ISP DNS server 115 as described in FIG. 1). For example, the services gateway may reference a table of stored ISP DNS addresses. The ISP may provide external network services to the services gateway. For example, the ISP may provide access to an external network such as the internet.

At operation 415, an internet address may be determined for a DNS service provider external to the ISP (e.g., the external DNS server 120 as described in FIG. 1). For example, the services gateway may reference a table of stored external DNS addresses. The DNS service provider external to the ISP may maintain a website filtering list. For example, the external DNS server may query a database of website filtering lists including a website filtering list corresponding to an external internet protocol (IP) address assigned to the services gateway by the ISP and a website filtering list corresponding to the computing device.

At operation 420, the DNS request may be forwarded to the internet address for the DNS service of the ISP and the internet address of the DNS service provider external to the ISP. For example, the services gateway may forward the DNS request to the ISP DNS server 115 (as described in FIG. 1) using its IP address and to the external DNS server 120 (as described in FIG. 1) using its IP address.

At operation 425, a first response to the DNS request may be received from the DNS service of the ISP. For example, the ISP DNS server 115 (as described in FIG. 1) may respond to a DNS request for the hostname somewebsite.com by returning an answer indicating that hostname somewebsite.com corresponds to IP address 127.0.0.1. The services gateway may then hold the response until a response is received from the DNS service provider external to the ISP.

At operation 430, a second response to the DNS request may be received from the DNS service provider external to the ISP. For example, the external DNS server 120 (as described in FIG. 1) may respond to a DNS request for the hostname somewebsite.com by returning an answer indicating that hostname somewebsite.com corresponding to IP address 127.0.0.1 is not blocked (e.g., contains an answer section). The services gateway may then hold the response until a response is received from the DNS service of the ISP.

At operation 435, a DNS request response may be transmitted to a client computing device upon receiving the first response and the second response to the DNS request. The client computing device may be connected to an internal network provided by the services gateway. In an example, the DNS request response to the client computing device may include a forward of the response to the DNS request received from the DNS service of the ISP. For example, the services gateway may forward the answer to the request received from the ISP DNS service indicating that somewebsite.com corresponds to IP address 127.0.0.1. In an example, the DNS request response may include a message that the website has been blocked by the DNS service provider external to the ISP. For example, the services gateway may return an IP address of a webpage providing content indicating that the hostname somewebsite.com was blocked and a reason the website was blocked.

In some examples, the response from the DNS service external to the ISP may include an empty answer section. In some examples, the service gateway may be configured such that it may resolve responses received with an empty answer section to a particular IP address for a particular ISP. This may allow different web pages to be displayed for different ISP. The external DNS service may be multi-tenant (e.g., serving requests from multiple ISPs, etc.) and if it returns the IP address of such a website, it may look the same for each ISP. In some examples, the services gateway may return an IP address corresponding to the ISP the services gateway is a subscriber.

In some examples, an identifier of a sender of the DNS request may be determined. In an example, the identifier may be an internal internet protocol (IP) address of the sender of the DNS request, the IP address being issued by the services gateway. The identifier of the sender may be forwarded to the DNS service provider external to the ISP along with the DNS request. For example, the sender of the DNS request may have an internal IP address of 192.168.1.2. The DNS service provider external to the ISP may use the identifier to select a website filtering list to use in determining a response to the DNS request. The response received from the DNS service external to the ISP may include the identifier of the sender and the client computing device to which the response is transmitted may correspond to the identifier of the sender. For example, the client computing device may be the sender of the request having internal IP address 192.168.1.2.

Figure 5:
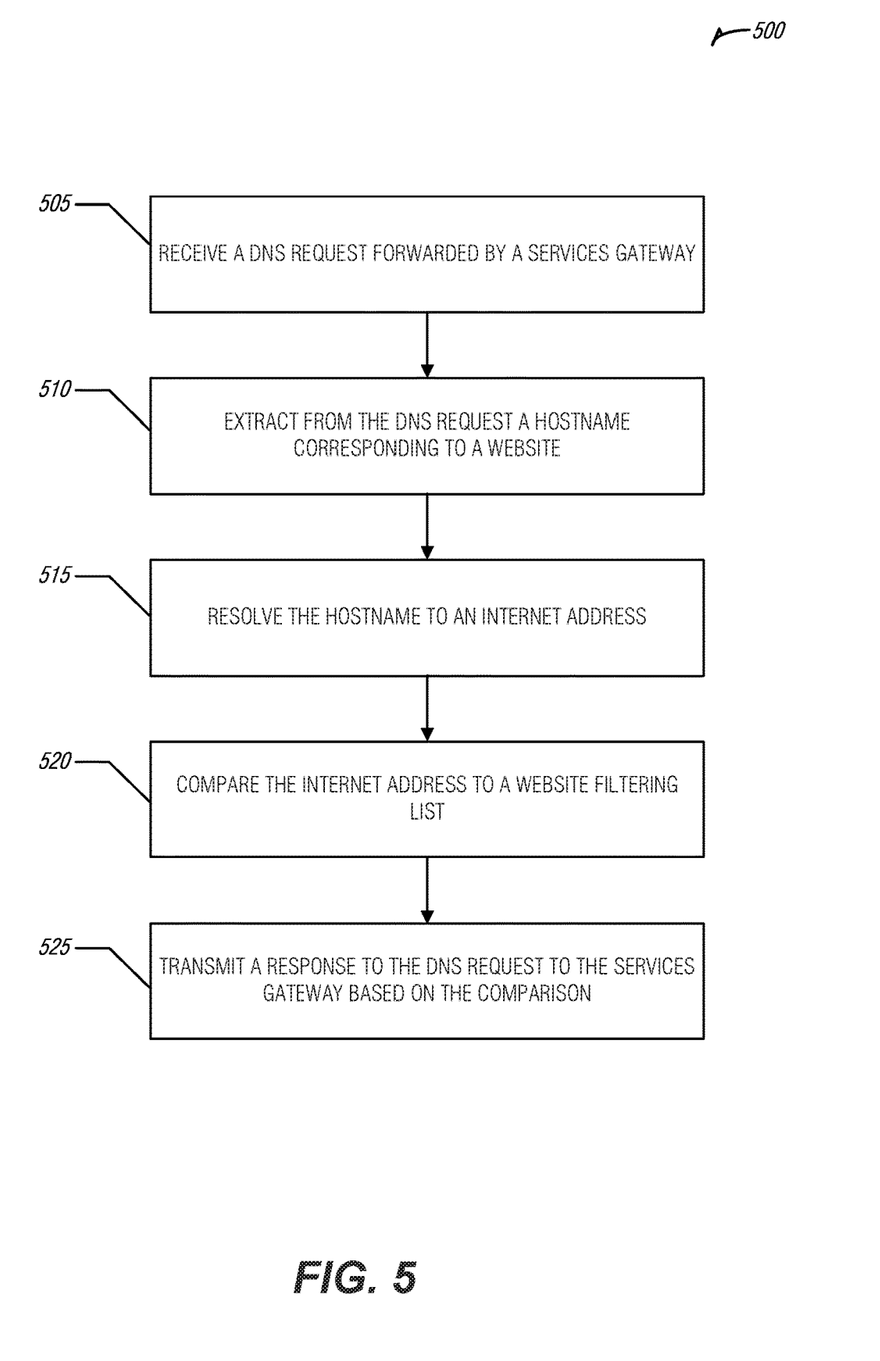
FIG. 5 illustrates a flowchart of an example of a method for website filtering using bifurcated domain name system, according to various embodiments.

FIG. 5 illustrates a flowchart of an example of a method 500 for website filtering using bifurcated domain name system, according to various embodiments. The method 500 may provide similar functionality as described in FIG. 2.

At operation 505, a domain name system (DNS) request forwarded by a services gateway may be received. For example, a DNS request may be received from a services gateway to resolve a hostname somewebsite.com to an internet protocol (IP) address.

At operation 510, a hostname corresponding to a website may be extracted from the DNS request. For example, the hostname may be somewebstie.com.

At operation 515, the hostname may be resolved to an internet address. For example, the hostname somewebsite.com may be resolved to IP address 127.0.0.1.

At operation 520, the internet address may be compared to a website filtering list. In an example, website filtering list may include one or more internet addresses. In some examples, a website category may be received from a user (e.g., the services gateway 110 as described in FIG. 1, a user of the services gateway 110, etc.). A set of internet addresses may be determined using the website category. The website filtering list may be created using the set of internet addresses. For example, a category of adult websites may be received and a repository of categorized websites may be referenced to create the website filtering list.

In some example, an identifier for a computing device that sent the DNS request to the services gateway may be received and the website filtering list may be selected using the identifier. For example, there may be several computing devices connected to the internal network of the services gateway, each computing device may have a unique IP address, a set website filtering lists may correspond to respective of unique IP address, and the website list may be selected using the IP address of a computing device that sent the DNS request to the services gateway.

At operation 525, a response may be transmitted to the DNS request to the services gateway based on the comparison. A response may be sent to the services gateway with an answer indicating that the hostname somewebsite.com resolves to IP address 127.0.0.1 if the comparison indicates the website is allowed. A response may be set to the services gateway with an answer that is blank if the comparison indicates the website is blocked. In an example, if the comparison indicates the website is blocked the response may include an answer including a message indicating why the website was blocked or an IP address for a website indicating why the website was blocked.

Figure 6:
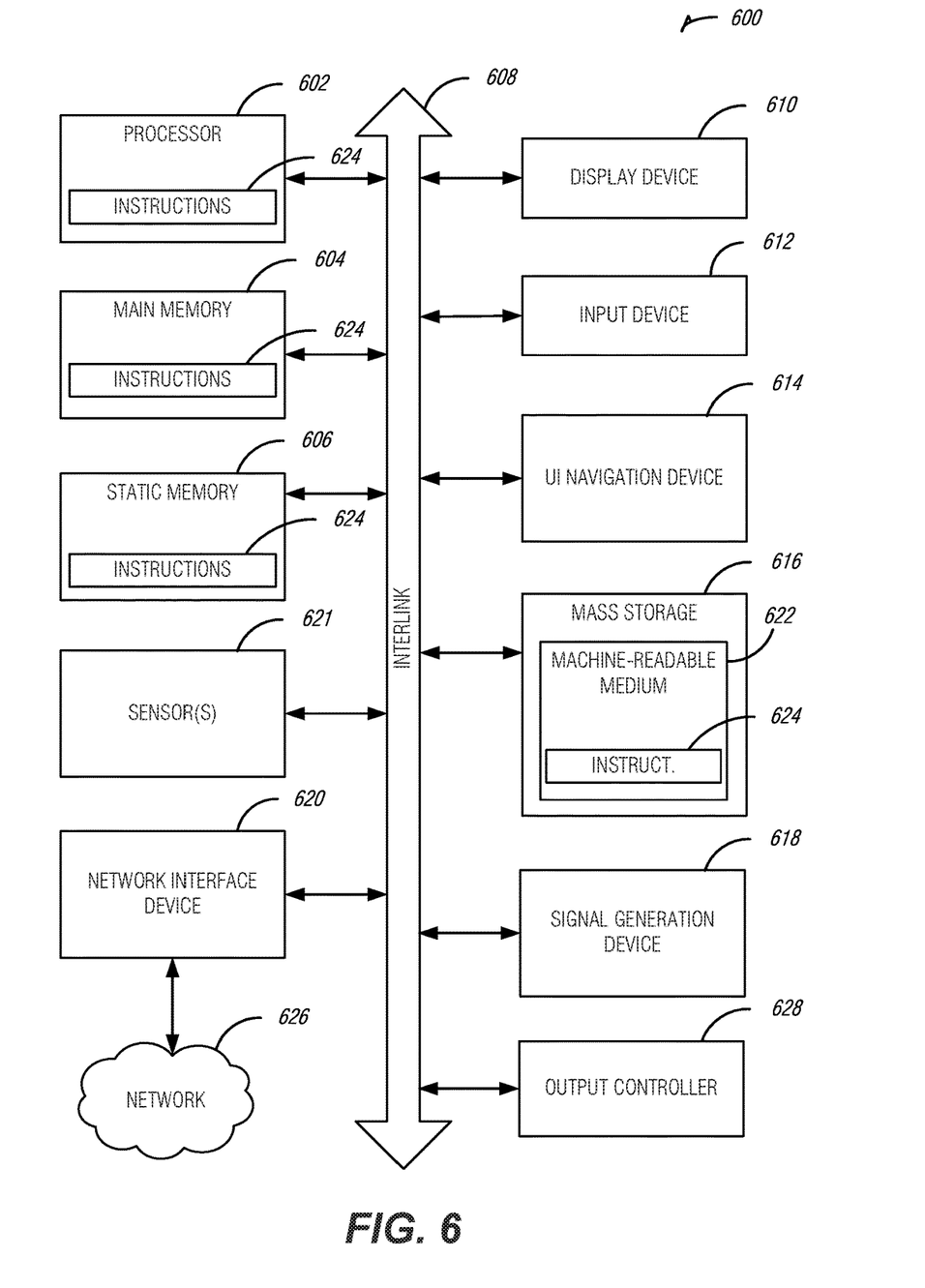
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., Universal Serial Bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

What is claimed is:

1. A services gateway for website filtering using bifurcated domain name system (DNS), the services gateway comprising:
   one or more processors; and
   at least one memory including instructions that, when executed by the one or more processors, cause the one or more processors to perform operations to:
   receive a DNS request, the DNS request including a hostname corresponding to a website;
   determine an internal identifier for a computing device that initiated the DNS request, wherein the identifier is unique to the computing device on an internal network of the services gateway;
   determine a first internet address for a DNS service of an internet service provider (ISP), the ISP providing external network services to the services gateway;
   determine a second internet address for a DNS service provider external to the ISP, the DNS service provider maintaining a website filtering list;
   forward the DNS request to both the first internet address for the DNS service of the ISP and the second internet address of the DNS service provider external to the ISP, wherein the DNS request forwarded to the DNS service provider external to the ISP includes the internal identifier;
   receive a first response to the DNS request from the DNS service of the ISP;
   receive a second response to the DNS request from the DNS service provider external to the ISP, the second response based on a filter applied to the results, the filter selected based on the internal identifier, wherein the filter is uniquely maintained for the computing device that corresponds to the internal identifier;
   compare the first response to the DNS request and the second response to the DNS request; and
   transmit a DNS request response to a client computing device, the client computing device connected to an internal network provided by the services gateway, wherein the DNS request response is based on the comparison.

2. The services gateway of claim 1, wherein the instructions to transmit the DNS request response to the client computing device include instructions to forward the response to the DNS request received from the DNS service of the ISP.

3. The services gateway of claim 1, wherein the second response to the DNS request includes a message that the website has been blocked by the DNS service provider external to the ISP.

4. The services gateway of claim 1, wherein the instructions further cause the one or more processors to perform operations to:
   determine an identifier of a sender of the DNS request;
   forward the identifier of the sender to the DNS service provider external to the ISP along with the DNS request; and
   wherein the second response received from the DNS service external to the ISP includes the identifier of the sender, and wherein the client computing device corresponds to the identifier of the sender.

5. The services gateway of claim 4, wherein the identifier is an internal internet protocol (IP) address of the sender of the DNS request, the IP address being issued by the services gateway.

6. The services gateway of claim 1, wherein the DNS request is received from a computing device connected to an internal network provided by the services gateway.

7. At least one machine readable medium including instructions for website filtering using bifurcated domain name system (DNS) that, when executed by a machine, cause the machine to perform operations to:
   receive a DNS request, the DNS request including a hostname corresponding to a website;
   determine an internal identifier for a computing device that initiated the DNS request, wherein the identifier is unique to the computing device on an internal network of a services gateway;
   determine a first internet address for a DNS service of an internee service provider (ISP), the ISP providing external network services to the services gateway;
   determine a second internet address for a DNS service provider external to the ISP, the DNS service provider maintaining a website filtering list;
   forward the DNS request to both the first Internet address for the DNS service of the ISP and the second internet address of the DNS service provider external to the ISP, wherein the DNS request forwarded to the DNS service provider external to the ISP includes the internal identifier;
   receive a first response to the DNS request from the DNS service of the ISP;
   receive a second response to the DNS request from the DNS service provider external to the ISP, the second response based on a filter applied to the results, the filter selected based on the internal identifier, wherein the filter is uniquely maintained for the computing device that corresponds to the internal identifier;
   compare the first response to the DNS request and the second response to the DNS request; and
   transmit a DNS request response to a client computing device, the client computing device connected to an internal network provided by the services gateway, wherein the DNS request response is based on the comparison.

8. The at least one machine readable medium of claim 7, wherein the instructions to transmit the DNS request response to the client computing device include instructions to forward the response to the DNS request received from the DNS service of the ISP.

9. The at least one machine readable medium of claim 7, wherein the second response to the DNS request includes a message that the website has been blocked by the DNS service provider external to the ISP.

10. The at least one machine readable medium of claim 7, wherein the instructions further cause the one or more processors to perform operations to:
    determine an identifier of a sender of the DNS request;

forward the identifier of the sender to the DNS service provider external to the ISP along with the DNS request; and wherein the second response received from the DNS service external to the ISP includes the identifier of the sender, and wherein the client computing device corresponds to the identifier of the sender.

11. The at least one machine readable medium of claim 10, wherein the identifier is an internal internet protocol (IP) address of the sender of the DNS request, the IP address being issued by the services gateway.

12. The at least one machine readable medium of claim 7, wherein the DNS request is received from a computing device connected to an internal network provided by the services gateway.

13. A method for website filtering using bifurcated domain name system (DNS), the method comprising:

receiving, by a services gateway, a DNS request, the DNS request including a hostname corresponding to a website;

determining an internal identifier for a computing device that initiated the DNS request, wherein the identifier is unique to the computing device on an internal network of the services gateway;

determining a first internet address for a DNS service of an internet service provider (ISP), the ISP providing external network services to the services gateway;

determining a second internet address for a DNS service provider external to the ISP, the DNS service provider maintaining a website filtering list;

forwarding the DNS request to both the first internet address for the DNS service of the ISP and the second internet address of the DNS service provider external to the ISP, wherein the DNS request forwarded to the DNS service provider external to the ISP includes the internal identifier;

receiving a first response to the DNS request from the DNS service of the ISP;

receiving a second response to the DNS request from the DNS service provider external to the ISP, the second response based on a filter applied to the results, the filter selected based on the internal identifier, wherein the filter is uniquely maintained for the computing device corresponding to the internal identifier;

comparing the first response to the DNS request and the second response to the DNS request; and transmitting a DNS request response to a client computing device, the client computing device connected to an internal network provided by the services gateway, wherein the DNS request response is based on the comparison.

14. The method of claim 13, wherein transmitting the DNS request response to the client computing device includes forwarding the response to the DNS request received from the DNS service of the ISP.

15. The method of claim 13, wherein receiving the second response to the DNS request includes receiving a message that the website has been blocked by the DNS service provider external to the ISP.

16. The method of claim 13, further comprising:

determining an identifier of a sender of the DNS request;

forwarding the identifier of the sender to the DNS service provider external to the ISP along with the DNS request; and wherein receiving the second response from the DNS service external to the ISP includes receiving the identifier of the sender, and wherein the client computing device corresponds to the identifier of the sender.

17. The method of claim 16, wherein determining the identifier of the sender includes determining an internal internet protocol (IP) address of the sender of the DNS request, the IP address being issued by the services gateway.

18. The method of claim 13, wherein receiving the DNS request includes receiving the DNS request from a computing device connected to an internal network provided by the services gateway.

* * * * *